(12) United States Patent
Stowe

(10) Patent No.: US 7,889,416 B1
(45) Date of Patent: Feb. 15, 2011

(54) METHOD OF ALIGNING A LIGHT BEAM IN AN OPTICAL SCANNING SYSTEM EMPLOYING AN AGILE BEAM STEERING MIRROR

(75) Inventor: Timothy D. Stowe, Alameda, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 12/428,467

(22) Filed: Apr. 22, 2009

Related U.S. Application Data

(62) Division of application No. 11/962,589, filed on Dec. 21, 2007, now Pat. No. 7,542,200.

(51) Int. Cl.
G02B 26/00 (2006.01)
G02F 1/29 (2006.01)
G02F 1/03 (2006.01)

(52) U.S. Cl. .................. 359/291; 359/254; 359/318

(58) Field of Classification Search ......... 359/290–292, 359/223–225, 245, 198, 260–263, 298, 301–303, 359/317–318, 237, 242, 247, 254
See application file for complete search history.

(56) References Cited

U.S. PATENT DOCUMENTS

| | | | |
|---|---|---|---|
| 5,018,808 A | 5/1991 | Meyers et al. | |
| 5,287,125 A | 2/1994 | Appel et al. | |
| 5,363,126 A | 11/1994 | Andrews | |
| 5,760,947 A | 6/1998 | Kim et al. | |
| 5,999,302 A | 12/1999 | Sweeney et al. | |
| 6,023,286 A | 2/2000 | Nowak et al. | |
| 6,052,229 A * | 4/2000 | Kim | 359/618 |
| 6,057,867 A | 5/2000 | Chan et al. | |
| 6,144,478 A | 11/2000 | Nowak et al. | |
| 6,232,991 B1 | 5/2001 | Appel | |
| 6,355,926 B1 | 3/2002 | Hubble et al. | |
| 6,480,645 B1 | 11/2002 | Peale et al. | |
| 6,490,384 B2 | 12/2002 | Yong | |
| 2005/0212899 A1 | 9/2005 | Clarke et al. | |
| 2006/0192328 A1 | 8/2006 | Morrison et al. | |
| 2006/0284790 A1* | 12/2006 | Tegreene et al. | 345/7 |

FOREIGN PATENT DOCUMENTS

| | | |
|---|---|---|
| EP | 0822700 A2 | 2/1998 |
| EP | 0928982 A2 | 7/1999 |
| EP | 1316834 A1 | 6/2003 |
| EP | 08172363 | 3/2009 |
| WO | 2005/024496 A2 | 3/2005 |

* cited by examiner

Primary Examiner—Scott J Sugarman
Assistant Examiner—Dawayne A Pinkney
(74) Attorney, Agent, or Firm—Jonathan A. Small

(57) ABSTRACT

Scan line position error resulting in banding, bow, skew, etc. is corrected by way of an agile beam steering mirror assembly in a ROS printing system and the like. The agile beam steering mirror system comprises a piezoelectric bending actuator fixedly mounted to a substrate at a proximate end thereof. A mirror structure is mounted at a free distal end of the bending actuator. Voltage applied to the bending actuator causes rotation of the mirror to thereby correct for positional errors of the scan line. Correction waveforms may be stored in control memory associated with the agile beam steering mirror assembly. A capacitive sensing circuit using a sensing electrode located beneath the free end of the bending actuator may be used in a feedback arrangement to determine and control mirror position.

1 Claim, 14 Drawing Sheets

METHOD OF ALIGNING A LIGHT BEAM IN AN OPTICAL SCANNING SYSTEM EMPLOYING AN AGILE BEAM STEERING MIRROR

CROSS-REFERENCE TO RELATED APPLICATIONS

The present application is a divisional application of non-provisional U.S. Application for Letters Patent titled "Agile Beam Steering Mirror for Active Raster Scan Error Correction", Ser. No. 11/962,589, filed Dec. 21, 2007, to which priority is hereby claimed, and which is hereby incorporated by reference herein.

BACKGROUND OF THE INVENTION

1. Field of the Invention

This invention relates to raster output scanners (ROS). More particularly it relates to an active element in the optical path of a ROS which addresses scan line skew and bow correction.

2. Description of the Prior Art

Electrophotographic marking is a well-known, commonly used method of copying or printing documents. Electrophotographic marking is performed by exposing a charged photoreceptor with a light image representation of a desired document. The photoreceptor is discharged where exposed, creating an electrostatic latent image of the desired document on the photoreceptor's surface. Toner particles are then deposited onto that latent image, forming a toner image, which is then transferred onto a substrate, such as a sheet of paper. The transferred toner image is then fused to the substrate, usually using heat and/or pressure, thereby creating a permanent record of the original representation. The surface of the photoreceptor is then cleaned of residual developing material and recharged in preparation for subsequent image production.

The foregoing broadly describes a black and white electrophotographic marking system. Electrophotographic marking can also produce color images by repeating the above process once for each color of toner that is used to make a composite color image. In one example of a color process, called a READ IOI process (Recharge, Expose, and Develop, Image On Image), a charged photoreceptive surface is exposed to a light image which represents a first color, say black. The resulting electrostatic latent image is then developed with black toner to produce a black toner image. The recharge, expose, and develop process is repeated, using the same photoreceptor, for a second color, say yellow, then for a third color, say magenta, and finally for a fourth color, say cyan. The various latent images and color toners are placed in a superimposed registration such that a desired composite color image results. That composite color image is then transferred and fused onto a substrate. Alternatively, a multiple exposure station system can be employed, requiring a separate charging, exposing, and developing station for each color of toner.

One way of exposing a photoreceptor in systems such as those described above is to use a Raster Output Scanner (ROS). A ROS is typically comprised of a laser light source (or sources), a pre-polygon optical system, a rotating polygon having a plurality of mirrored facets, and a post-polygon optical system. In a simplified description of operation, a collimated laser beam is reflected from the facets of the polygon and passed through imaging elements that project the laser beam into a finely focused spot of light on the photoreceptor's surface. As the polygon rotates (with the photoreceptor fixed), the focused spot traces a path on the photoreceptor surface referred to as a scan line. By synchronizing motion of the photoreceptor with the polygon rotation, the spot raster scans (i.e., one line after another) the surface of the photoreceptor. By modulating the laser beam with image information a predetermined latent image is produced on the photoreceptor. The plane of the sweeping beam is referred to herein as the tangential plane while the direction of motion of the photoreceptor is called the sagittal direction.

Raster output scanners are typically comprised of a number of optical elements. Unfortunately, unavoidable imprecision in the shape and/or mounting of these optical elements inevitably introduces anomalies in the quality of the scan line on the photoreceptor. One such anomaly is slight variation in scan line spacing on the photoreceptor. Such spacing variation, even if slight, can lead to perceptible tone variation in the scan line direction of the printed image, commonly referred to as banding artifacts. FIG. 1 shows light and dark streaks within an image 4 which represent banding artifacts in that image as printed.

Another such artifact is called bow. Bow is a deviation of a scan line in the shape of a frown or a smile. FIG. 2 illustrates two scan lines having different bows, a first scan line 6 has a "smile" shaped bow while the second scan line 7 has a "frown" shaped bow. FIG. 2 also shows an ideal scan line 5 without bow. A useful measurement for bow is the deviation between the top and the bottom of the scan line. In a monochromatic system if the bow deviation is kept below about 150 microns then the bow does not create a significant print quality problem. However, in color printing, particularly when using multiple raster output scanners, such errors seriously degrade print quality. Indeed, when multiple raster output scanners are used, if one bow forms a frown while the other forms a smile, bow errors of less than 10 microns degrade the final image. In high quality systems scan line bow should be held to about 2 microns.

Still another such artifact is called skew. While bow is a nonlinearity in the scan line, skew is an angular deviation of the scan line from the plane of the rotation axis of the photoreceptor. That is, tilt relative to the desired scan line. Artifacts such as line-to-line registration error, rotation of the printed image, etc. result.

One source of these artifacts is a slight imperfection in the advancement of the photoreceptor relative to the scan line. If this advancement is off by a slight amount, the scan line spacing from one line to the next varies slightly. In such a case, there may be a gap in the toner or similar material applied to the substrate as between two adjacent lines. This gaps affects the tone of the printed image along an entire scan line. The human eye is particularly sensitive to this type of artifact, and perceptible light and dark bands appear in the printed image.

Another source of such scan line spacing variations occurs when the center ray of a light beam passing through a lens does not scan along the optical axis of the lens. The farther the center ray of the beam is from the optical axis of the lens, the greater the bow. It should be noted that while it is the scan line deviations from the optical axes of the post polygon optical elements that usually produces bow, almost any optical component can introduce those deviations.

Various approaches to scan line position error correction exist today. One method is to use high quality optical systems, such systems being carefully matched when multiple raster output scanners are used. However, this approach is often prohibitively expensive, particularly when machine assembly is taken into consideration. Even then, meeting a 2 micron bow deviation requirement cannot always be met. Another approach is to add an optical element into the raster output scanner's optical system. For example, U.S. Pat. No. 5,383, 047 teaches the introduction of a glass plate into the pre-polygon optical system. Rotation of that glass plate corrects for bow. However, that approach requires the introduction of another piece of glass into the optical path. Furthermore, in many raster output scanners it is the post-polygon optical system that introduces most of the scan line position error.

Other examples of known scan line position error correction use active feedback to adjust speed and line spacing, for example by using a piezo actuator to adjust in real time the position of the scan line. This is accomplished by actively translating a small lens element or tilting a mirror or in order to deflect the entire scan line. See, e.g., U.S. Pat. No. 6,232, 991, which is incorporated herein by reference. However, any real time line spacing correction mechanism requires an actuator having a resonant frequency slightly above the line scan frequency, typically on the order of a few kHz. Consequently, printing speed is then limited by the resonant frequency of the feedback control system. Furthermore, bow and skew can lead to color registration or banding issues on part of a scan line even when feedback control systems are use because such systems measure scan positions at the edges of the photoreceptive drum or belt.

It should further be noted that the aforementioned line spacing, bow, and skew issues have heretofore prohibited seamlessly integrating side-by-side ROS systems in order to extend ROS-based printing systems to wider formats.

In light of the foregoing, and in further view of the desire to provide systems capable of printing without perceptible banding, bow, and skew, a new system and technique of correcting scan line position errors is needed.

SUMMARY OF THE INVENTION

Accordingly, the present invention is directed to a system and method for providing a low-cost micromachined piezoelectric steering element that has high enough bandwidth to actively correct for scan line spacing error, in-line skew and bow, and color registration. It can replace a standard folding mirror in existing ROS designs and may eliminate higher cost optical compensating elements.

In order to correct for scan line spacing error, in-line skew and bow, and color registration, an agile beam steering system is provided that can dynamically change line position in real time (i.e., while the raster beam is scanning). In addition to having a high resonant frequency, the agile beam steering system of the present invention has low mechanical Q such that vibrations do not excite ringing. Finally, the agile beam steering system of the present invention may be implemented at relatively low cost and complexity and in a small footprint, thus providing an overall commercially reasonable solution.

According to one aspect of the invention, an agile mirror device is introduced into the optical path of a ROS system. The agile mirror is composed of a micromachined silicon mirror mounted at the end of a cantilevered piezoelectric bimorph bending actuator. This bender is in turn anchored to a low expansion ceramic substrate on which two drive electrodes and a sensing capacitive electrode are formed. The miniature mirror is attached to the end of the piezoelectric bender along one central ridge or several posts situated along the midpoint of the mirror width. These attachment points serve to isolate mounting stresses due to epoxy attachment as well as small differences in the coefficient of expansion (CTE) between the piezoelectric bender and the silicon mirror.

A capacitive air gap is provided between the bimorph bender and the sensing electrode to form a sensing capacitive structure. This air gap provides sense capacitance as well as air damping of the structure in order to reduce or eliminate ringing.

A voltage is applied to a first electrode causing the piezoelectric cantilevered structure to bend. An AC signal is applied to a second electrode, providing displacement information and permitting feedback control to compensate for lower bandwidth issues related to piezoelectric creep, piezoelectric aging, electronics drift due to the HV amplifier warm up, temperature dependent tilt due to CTE mismatches, etc.

The above is a summary of a number of the unique aspects, features, and advantages of the present invention. However, this summary is not exhaustive. Thus, these and other aspects, features, and advantages of the present invention will become more apparent from the following detailed description and the appended drawings, when considered in light of the claims provided herein.

BRIEF DESCRIPTION OF THE DRAWINGS

In the drawings appended hereto like reference numerals denote like elements between the various drawings. While illustrative, the drawings are not drawn to scale. In the drawings.

17A-C illustrate the steps in the process of mounting a micromachined mirror onto a bending actuator, as well as other steps, involved in the manufacture of an agile beam steering mirror assembly according to an embodiment of the present invention.

Figure 18:
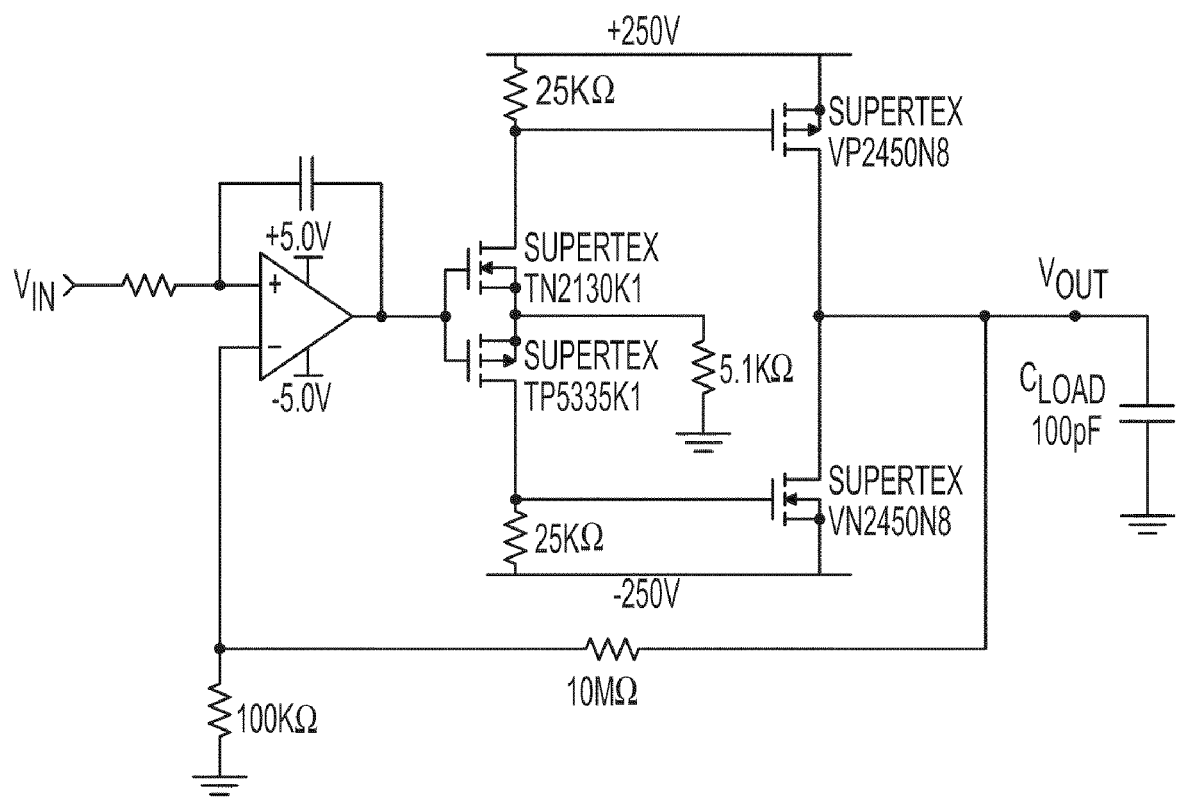

FIG. 18 is a schematic illustration of a single channel amplifier with discrete HV FETs of a type which may be employed in one embodiment of the present invention.

Figure 19:
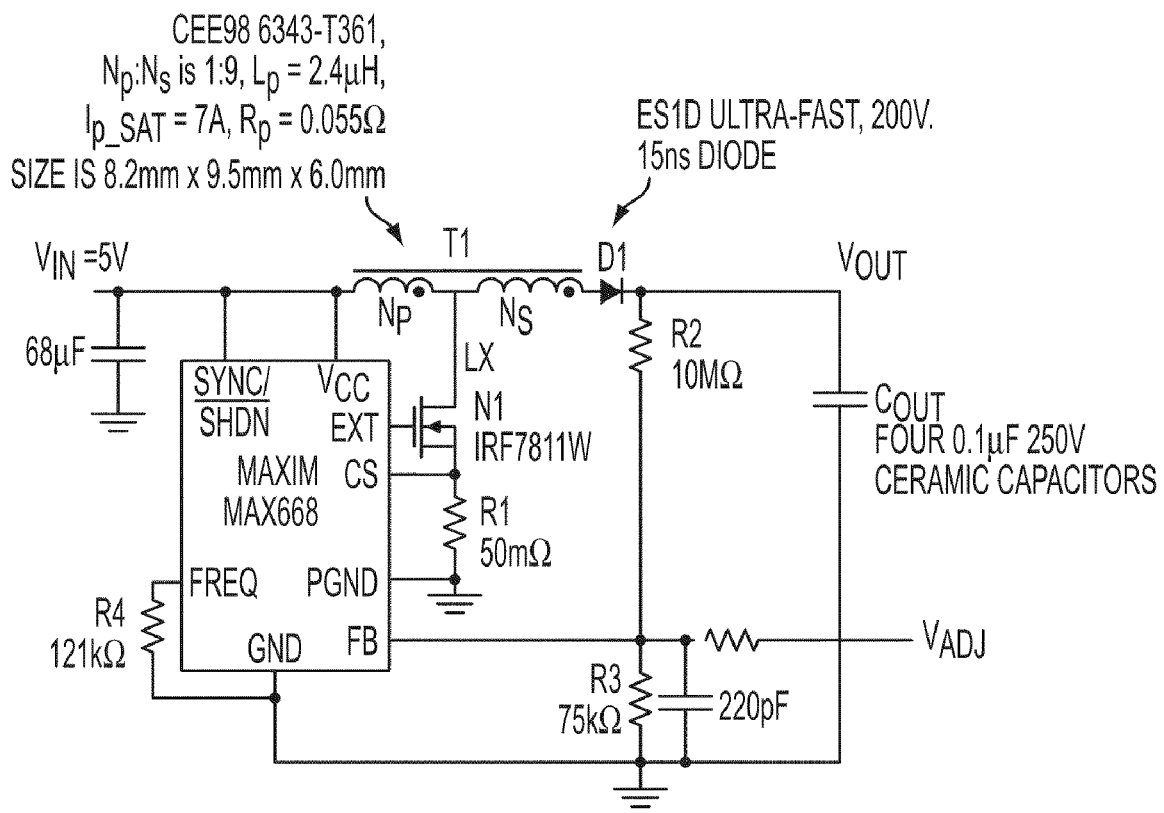

FIG. 19 is an schematic illustration of a HV supply assembled from discrete components of a type which may be employed in one embodiment of the present invention.

Figure 20:
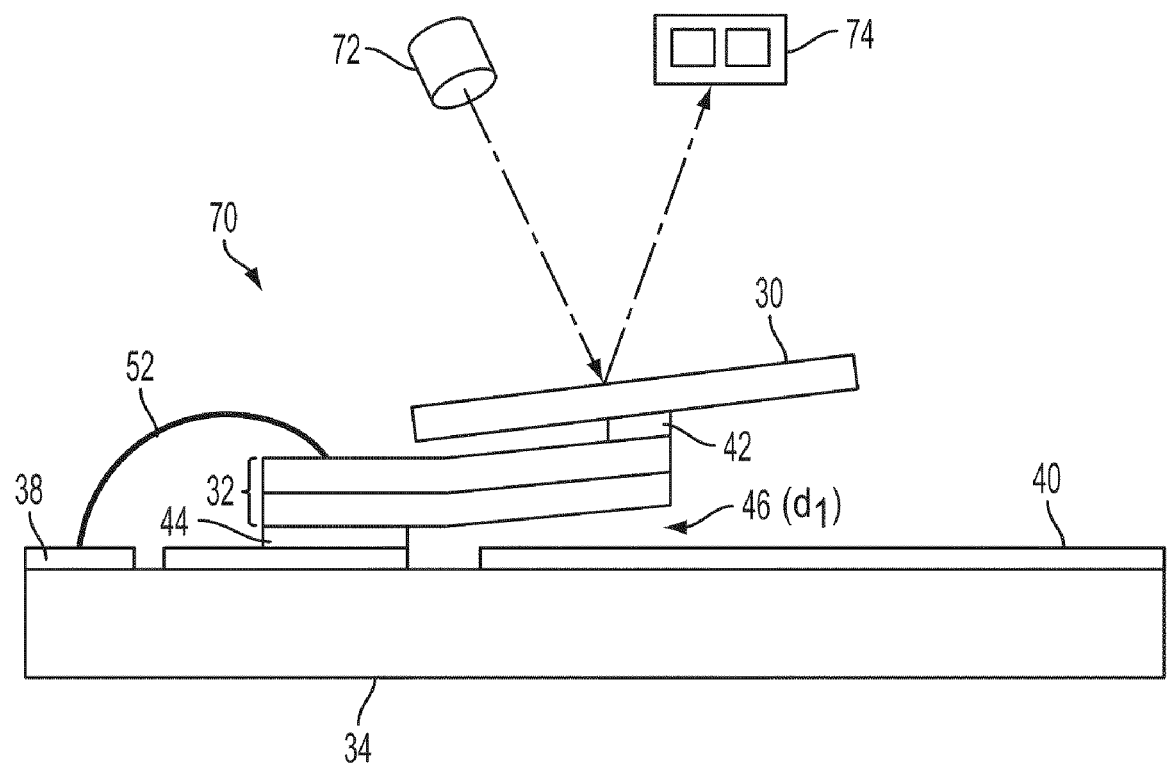

FIG. 20 is an elevation view of a system for high bandwidth calibration of an agile beam steering mirror assembly according to an embodiment of the present invention.

DETAILED DESCRIPTION OF THE INVENTION

Various embodiments of an agile mirror device for ROS systems according to the present invention will now be described, as well as example methods of manufacturing and components employed in the operation of same. It will be understood that the following are merely examples of various aspects of the present invention, and provide a framework for an understanding of the scope of the present invention.

Figure 1:
FIG. 1 is an image of a type printed by a prior art ROS printing apparatus illustrating the effect referred to as banding.
Figure 2:
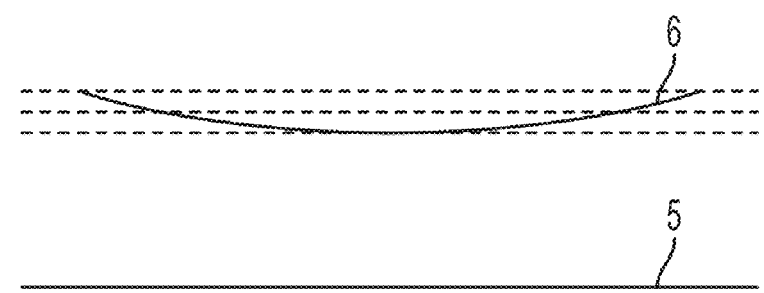
FIG. 2 is an illustration of the effect referred to as bow.
Figure 2:
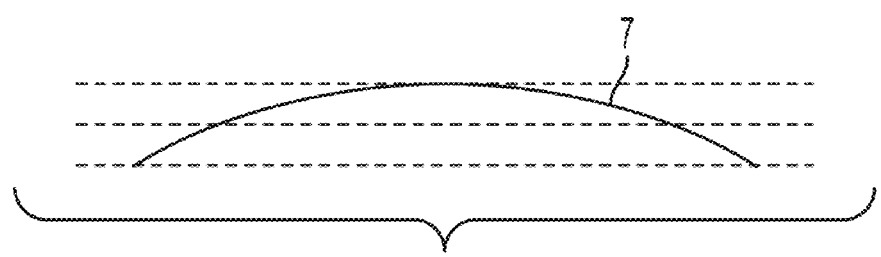
Figure 3A:
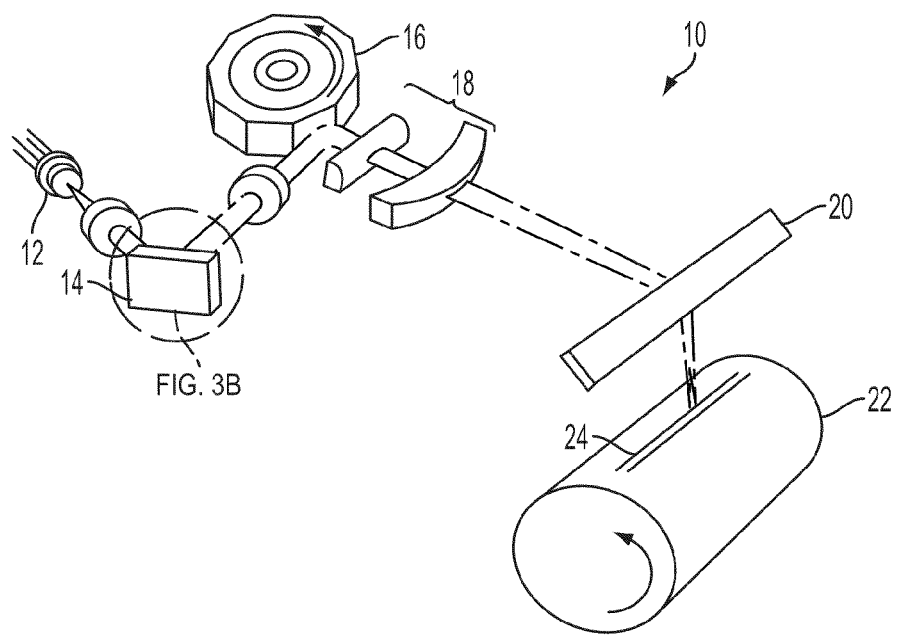
FIG. 3A is an illustration of a ROS apparatus including an agile beam steering mirror assembly according to one embodiment of the present invention.

With this in mind, shown in FIG. 3A is a ROS system 10 which includes a light source such as laser 12, the agile beam steering mirror assembly 14 according to the present invention, a rotating polygon mirror assembly 16, scan optic assembly 18, mirror 20, and photoreceptive drum 22. Following the path of light emitted from laser 12, a light beam is incident on agile beam steering mirror assembly 14 which adjusts the beam position as described further below. The beam is directed by the agile mirror system 14 to the rotating polygon mirror 16, which causes the beam to move in the scan direction. The beam is then focused by scan optics 18, and reflected by mirror 20 so that it scans across the surface of photoreceptive drum 22 creating scan lines 24. As the beam is pulsed, individual pixels are exposed on along the scan line 24 thereby creating an exposure pattern representing a latent image on the surface of photoreceptive drum 22.

Figure 3B:
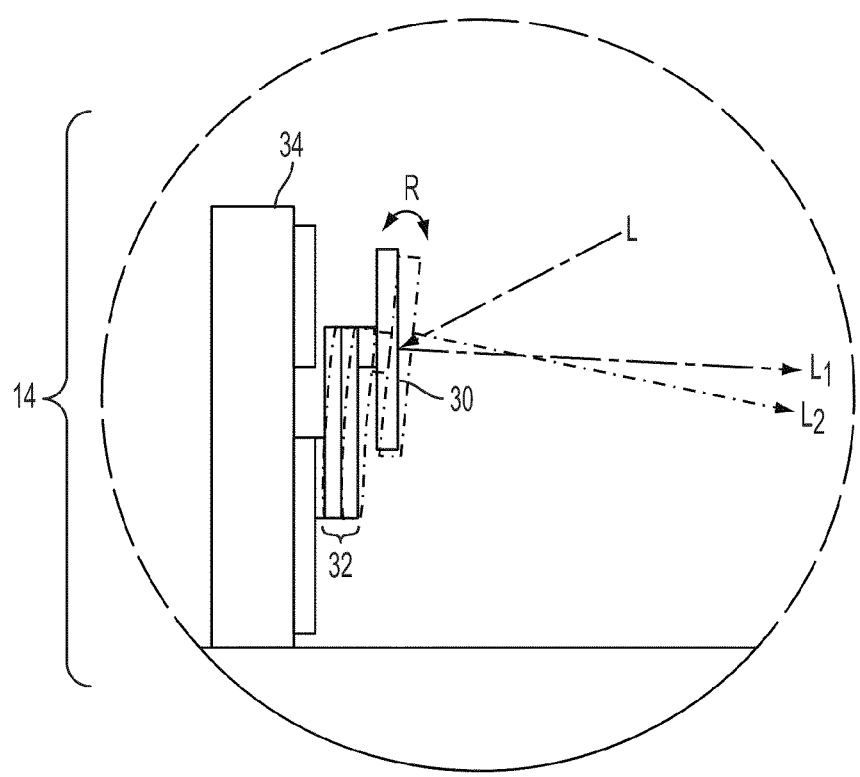
FIG. 3B details the operation of the agile beam steering mirror assembly in the ROS illustrated in FIG. 3A.

Shown in FIG. 3B is an expanded side-view of agile beam steering mirror 14. The specific elements of agile beam steering mirror assembly 14 are described in further detail below. However, it should be noted from FIG. 3B that agile beam steering mirror assembly 14 includes a micromachined mirror structure 30 having a primary plane which can be varied by application of a potential across a piezoelectric bimorph bending actuator 32, causing bending actuator 32 and mirror 30 which is attached thereto to rotate in the direction R (the rotated state shown by the dashed outline of those portions of agile beam steering mirror assembly 14). In an unrotated state, mirror structure 30 reflects a beam of light L into a first beam path $L_1$. In a rotated state, mirror structure 30 reflects beam L into a second beam path $L_2$.

Figure 4:
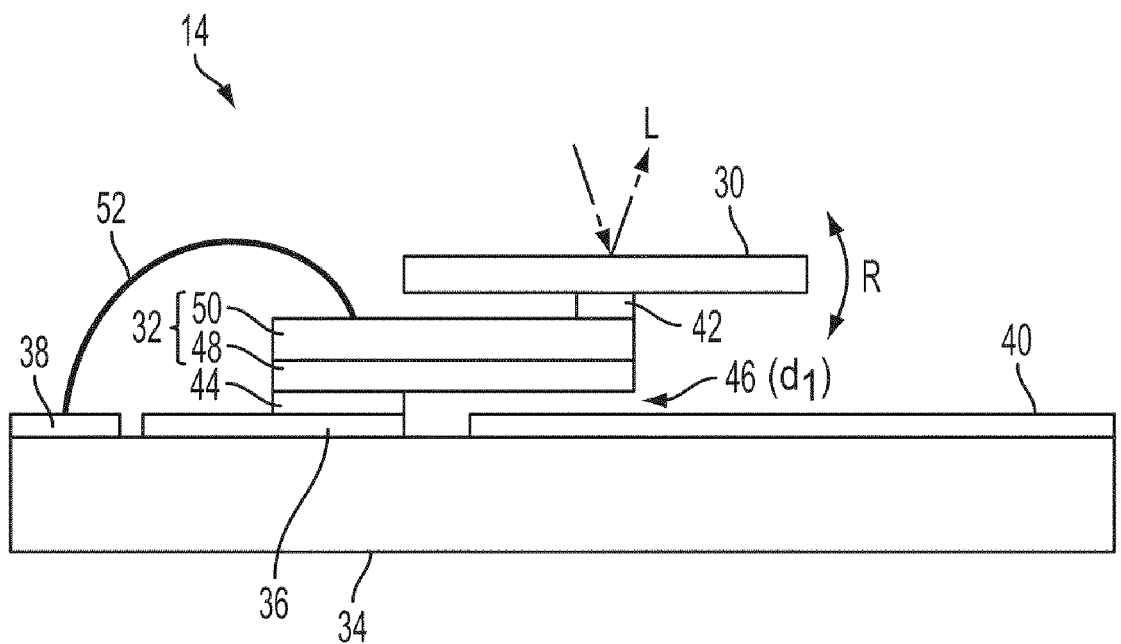
FIG. 4 is an elevation view of an agile beam steering mirror in an unrotated state according to an embodiment of the present invention.
Figure 5:
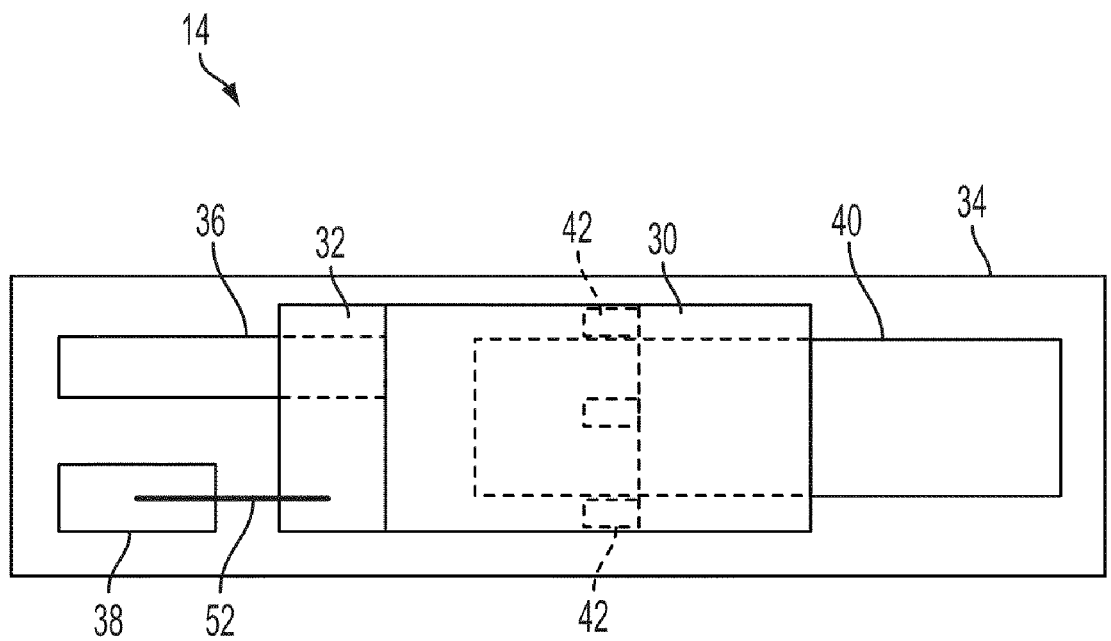
FIG. 5 is a top view of an agile beam steering mirror according to the embodiment shown in FIG. 4.
Figure 6:
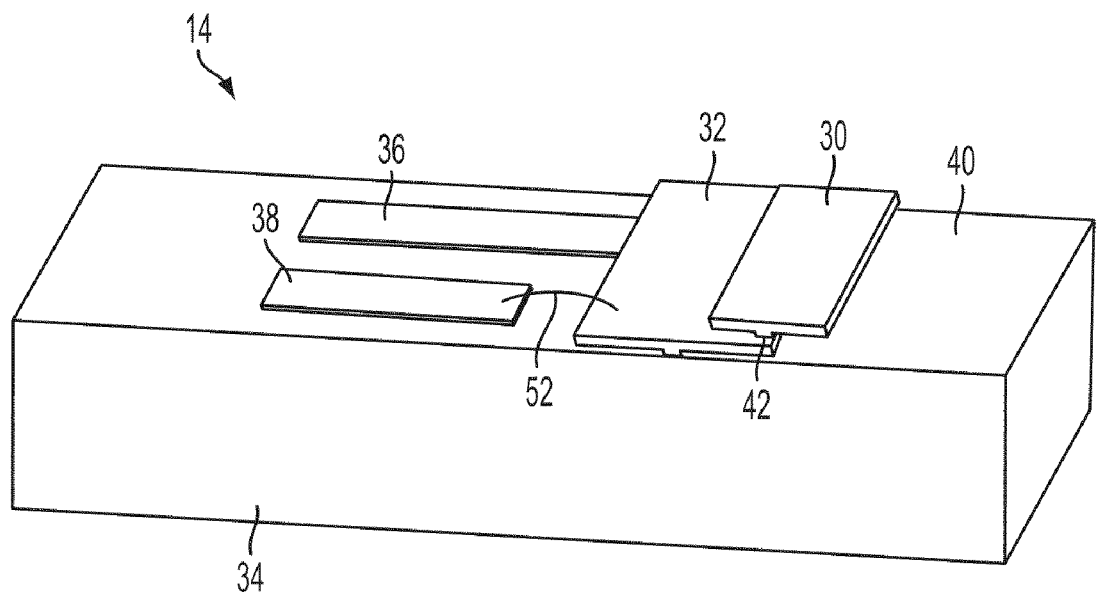
FIG. 6 is a perspective view of an agile beam steering mirror according to the embodiment shown in FIG. 4.

With reference to FIG. 4 (profile view), FIG. 5 (elevation view), and FIG. 6 (perspective view), details of the agile beam steering mirror assembly 14 are next discussed. Agile beam steering mirror assembly 14 according to the present invention comprises a low expansion ceramic substrate 34 having formed thereon first and second drive electrode 36, 38, respectively, and a capacitive sensing electrode 40. Electrodes 36, 38, and 40 may be formed, for example by screen printing or other appropriate process.

Mounted in physical and electrical contact with first drive electrode 36, and in physical contact with substrate 34 is a solder bonding pad 44. A laminated (bimorph) bending actuator 32 is mounted to solder bonding pad 44. The bimorph may be comprised of a wide variety of material, but according to one embodiment of the present invention, it is constructed of two PZT (two layers of lead-zirconate titanate) layers with a shim material therebetween according to the specifications for T266-H4-303X material (available from www.piezo.com). Bending actuator 32 is mounted at the proximal end thereof to said solder bonding pad 44. A micromachined silicon mirror 30 is mounted at the distal end of said bending actuator 32. Mirror 30 is attached to bending actuator 32 at a ridge or series of posts 42 situated along the midpoint of the width of mirror 30. This ridge or series of posts 42 serve to isolate mounting stresses by limiting the area strain resulting from epoxy or solder attachment as well as distortion due to small differences in the coefficient of thermal expansion between the materials forming piezoelectric bender 32 and the materials forming silicon mirror 30.

Whereas first drive electrode is electrically connected to a lower layer 48 of bending actuator 32, second drive electrode is electrically connected to an upper layer 50 of bending actuator 32 by an electrical lead 52.

A capacitive air gap 46 (shown in FIG. 4) is provided between bending actuator 32 and capacitive sensing electrode 40 to form a capacitive sensing structure. In an undeflected state, the width of this air gap is $d_1$. Air gap 46 is on the order of $d_1=12$ micrometers or less and serves to provide an air damping body in order to provide a means for passively over-damping the mechanical response of the mirror to eliminate ringing. This also reduces the sensitivity of the mirror to in-situ mechanical vibrations present inside a printer. Air gap 46 also served as the dielectric for a capacitor formed between capacitive sensing electrode 40 and lower layer 48 of bending actuator 32.

Figure 7:
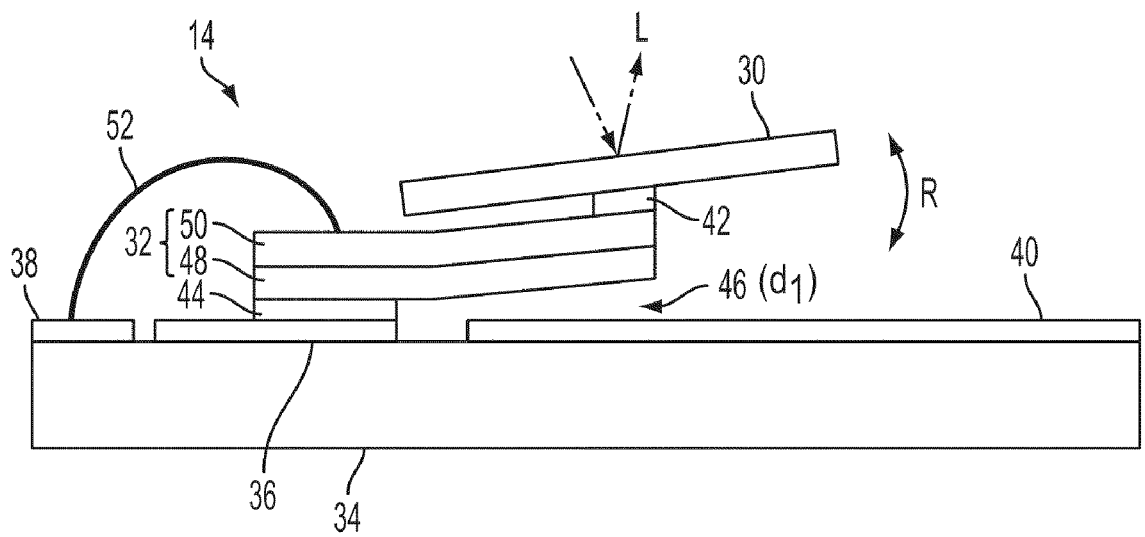
FIG. 7 is an elevation view of an agile beam steering mirror according to the embodiment shown in FIG. 4 in a rotated state.

Piezoelectric bending actuator 32 can be used to change the angle of mirror 30 if the mirror is attached at the free end. Mirror 30 rotated in the direction R is illustrated in FIG. 7. To accomplish this rotation, a voltage is applied to upper layer 50 of the piezoelectric bending actuator 32 via second drive electrode 38 and electrical lead 52, causing a differential strain between the layers of the bending actuator 32, in turn causing bending actuator 32 to deflect or rotate around the proximal end thereof, which is affixed to substrate 34 by solder pad 44. This causes a change in the distance d between the lower layer 48 of the bending actuator 32 and the capacitive sensing electrode 40.

Figure 8:
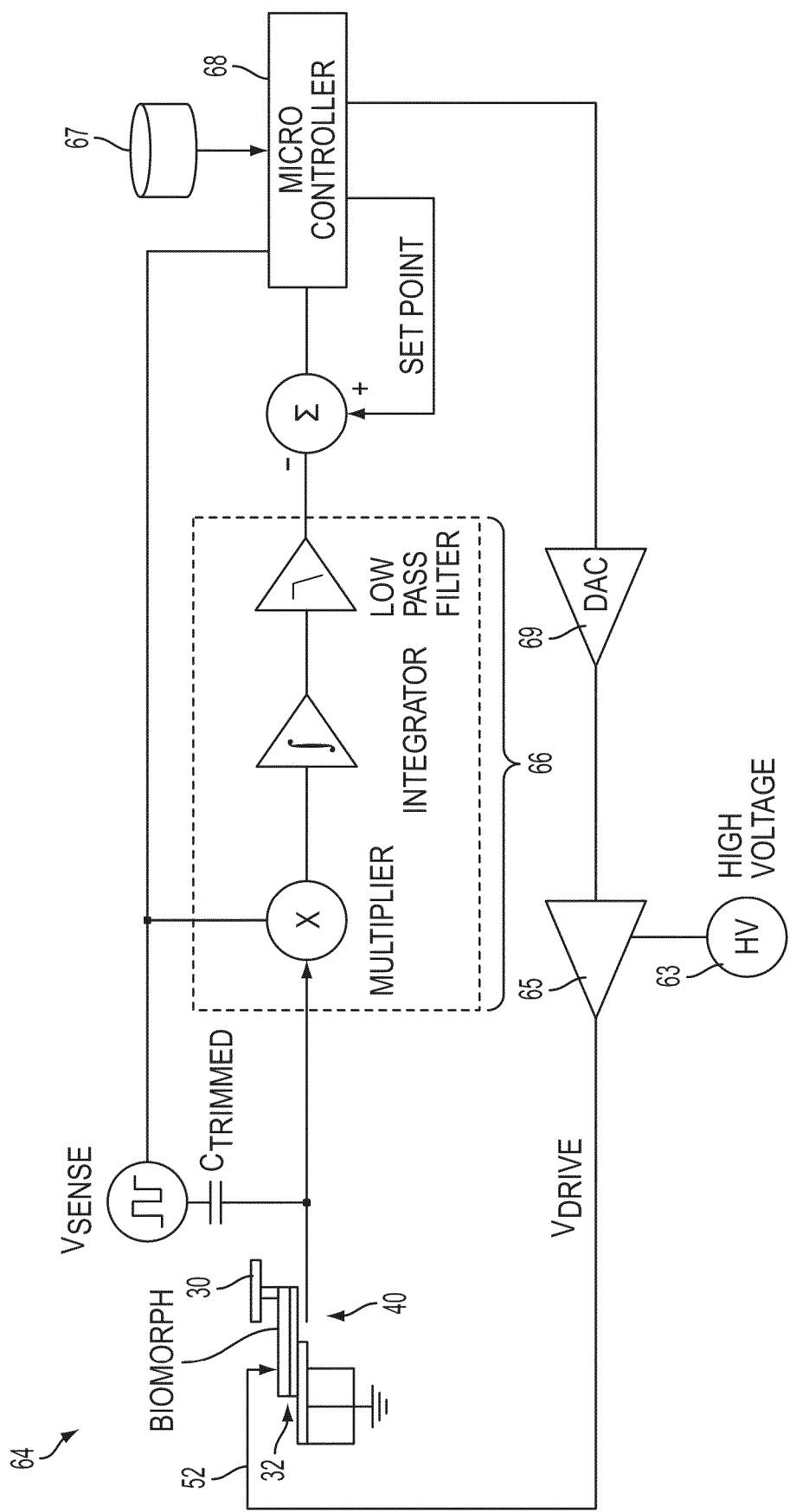
FIG. 8 is a schematic illustration of a capacitive sensing arrangement for sensing the extent of deflection or rotation of a bending actuator and mirror structure according to an embodiment of the present invention.

The extent of deflection or rotation of bending actuator 32, and hence of mirror 30, may be monitored using a capacitive sensing arrangement. With reference to FIG. 8, according to such an arrangement, a high frequency AC signal, $V_{sense}$, is applied to the capacitive sensing electrode 40 in order to measure the complex impedance 1/jwC and determine the difference between $d_1$ and $d_2$, which is the increased dielectric space of the capacitor formed by electrode 40, layer 48, and gap 46 there between. This distance may be utilized by sensing circuit 66 in order to gauge the position of mirror 30 and obtain a rotation producing the desired beam angle correction. The drive voltage, $V_{drive}$, provided to one layer, such as upper layer 50, of bending actuator 42 is determined by microcontroller 68 utilizing the position information provided by sensing circuit 66 and a predetermined correction waveform stored, for example, in on-board memory 67. The analog control signal from digital to analog converter (DAC) 69 may be created using a separate integrated circuit chip as shown in FIG. 8 or be integrated directly into the microcontroller itself. However, the high voltages levels necessary to drive the piezoelectric actuator 32 require a high voltage (HV) amplifier 65 and high voltage power supply 63 to create the appropriately scaled $V_{drive}$ signal. This overall feedback loop need not directly compensate for high bandwidth hysteresis motion of the piezoelectric elements, as this behavior is repeatable and can be compensated for directly in memory. However it is essential for this feedback circuit to compensate for lower bandwidth issues related to piezoelectric creep, piezoelectric aging, electronics drift due to the HV amplifier warm-up, and temperature dependent drift in the tilt over time.

Figure 9:
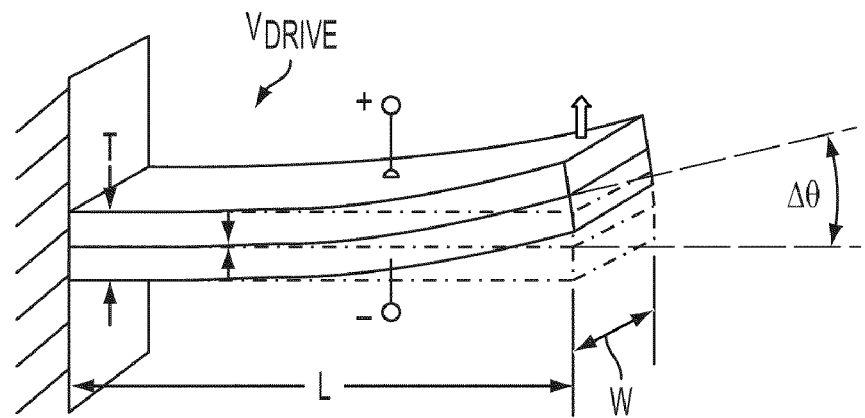
FIG. 9 is a perspective view of a rotating piezoelectric bimorph bending actuator.

For a cantilevered piezoelectric bending actuator of length L and width W, as depicted in FIG. 9, the deflection angle $\Delta\theta$ is proportional to $L^2$ whereas the resonant frequency is proportional to $1/L^2$ and both are independent of width W. The length of the piezoelectric bender is therefore chosen so as to maximize the resonant frequency and actuation bandwidth of the system while maintaining an adequate angular deflection range, $\theta$, for a maximum available drive voltage. It is important to note both positive and negative deflection angles are achievable based on the sign of the applied drive voltage $V_{drive}$.

For a simple two element (bimorph) piezoelectric bender with a free distance length of L=2 mm, and for mirror dimensions of approximately 3 mm wide×11 mm long×500 um thick we have both measured and experimentally verified steering angles approaching 0.06 degrees and resonant frequency above 30 kHz, high enough bandwidth and actuation range for useful bow correction in xerographic raster scanning systems. These measurements and calculations are based on the commercially availably piezoelectric bending actuators 32 made from a bimorph arrangement of piezoelectric material Lead-Zirconate Titanate (PZT) and described in further detail under the product specification T266-H4-303X available from www.piezo.com. Other commercially available piezoelectric benders are also readily available. In some cases, increased performance can be achieved by using piezoelectric bending actuators with more than two piezoelectric layers and using higher performance piezoelectric materials which produce more displacement for a given voltage.

Another practical issue to address for such a high bandwidth mechanical system is the fact that the mirror must be thin and light weight enough to reduce the effects of mass loading in order to achieve high bandwidth beam steering during operation. However, the mirror must also meet stringent flatness specifications during operation. In order to be a useful device for dynamic bow correction, an agile mirror flatness better than $\lambda/6$ needs to be maintained during operation and over the lifetime of the product, where $\lambda$ is typically in the near infrared such as $\lambda=780$ nm. The fact that the mirror must be made thin for high bandwidth reasons also presents several challenges with respect to maintaining mirror flatness during the system assembly and during operation.

Figure 10:
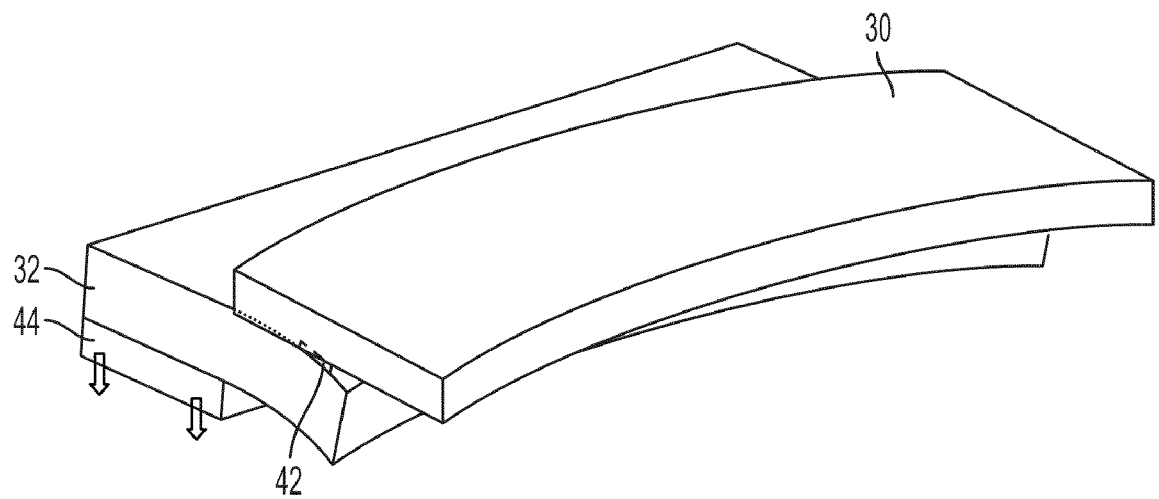
FIG. 10 illustrates the static distortion of the mirror flatness that can result from stress created from a small temperature change.

FIG. 10 illustrates the results of a finite element analysis showing the mirror curvature (exaggerated for effect) caused by a temperature rise of 10 degrees that induces differential thermal stress caused by slight variations in coefficients of thermal expansion (CTE) between the mirror and the piezoelectric bender. While printing systems typically operate over a narrow temperature range, heat due to electrical dissipation in the piezoelement is generated during the operation of the steering mirror and the absolute temperature of the printing system cannot be guaranteed. Thus, a method of mounting the mirror to the piezoelectric bender with minimal static stress is needed.

Figure 11A:
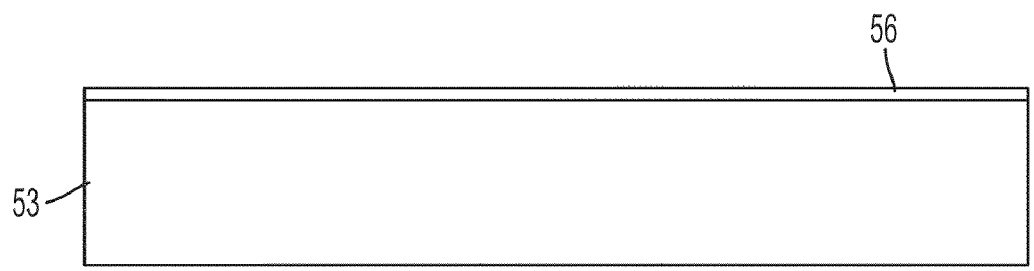
FIGS. 11A-C illustrate the process of creating a steering mirror with a reflective surface coating and stress relieving grooves for maintaining mirror flatness over temperature.
Figure 11B:
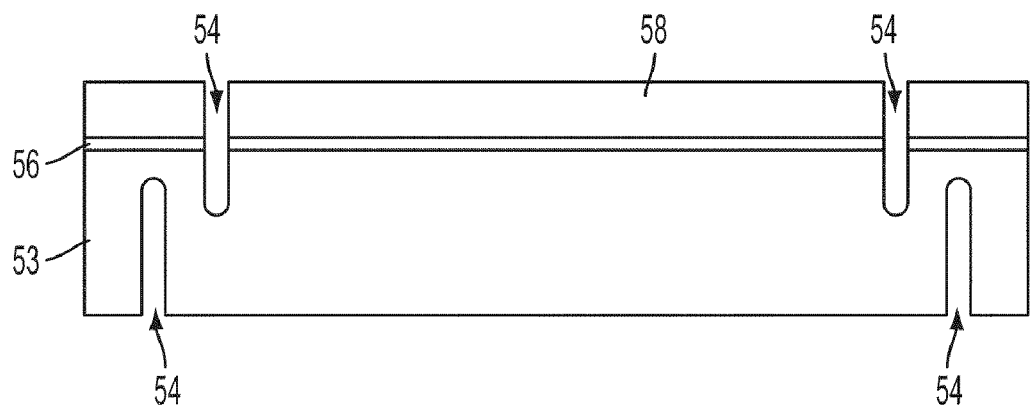
Figure 11C:
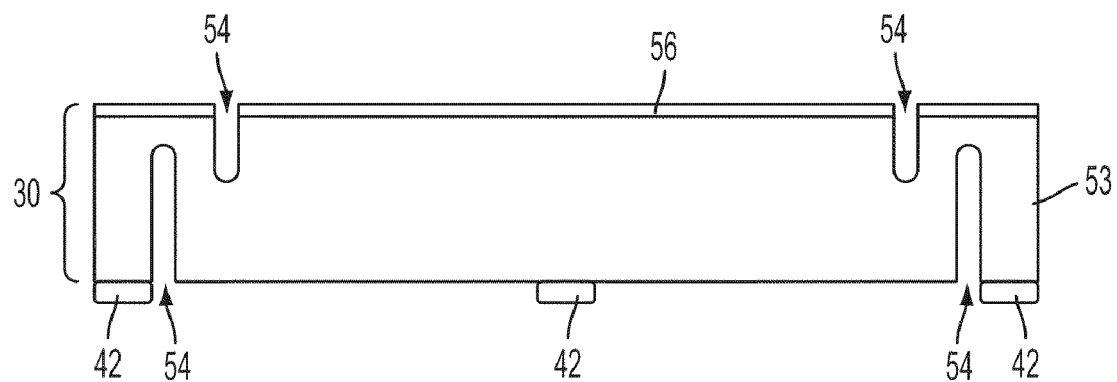

FIGS. 11A-C shows a simple manufacturing process to form the miniaturized mirror 30 together with a structure for helping to dramatically reduce attachment stresses leading to unacceptable mirror curvature. Here a flat substrate 53 of silicon or glass is used to form the mass of the agile steering mirror and is nominally in the range of 400-600 microns thick. First, a reflective surface is formed by sputtering a thin metal layer 56 using highly reflective materials such as a gold-titanium alloys or evaporating a thin metal layer such as aluminum. This reflective layer 56 is nominally no thicker than 70 nm in order to preserve mirror flatness. Next deep grooves 54 are cut into the cross-section of the mirror near its edges so as to form strain relieving structures that isolate the mounting stresses between the mirror and the piezoelectric bender when they are later assembled together. During the cutting of these deep grooves, the reflective metal on top of the mirror surface is protected with a sacrificial layer 58 such as photoresist. Such grooves can be cut with a dicing saw typically having a kerf-width of 50 micrometers. These deep groves allow stress relaxation at the edges of mirror 30. Forming grooves 54 on both the metal- and post-sides of micromachined mirror 30 allow a folded spring structure to release the stress from CTE mismatches. While FIG. 11B illustrates one pattern of grooves 54, may variations are possible, such as grooves being formed in a single side, grooves in a single end, etc.

Finally the miniaturized mirrors can be formed into single dies using a dicing saw. Following formation of grooves 54 and singulation, the mirror protection 58 is removed, and the structure cleaned. Finally, the attachment points (42) between the mirror and piezoelectric bender are selected along the midpoint of the mirror width such that the mirror is attached at its center and at its ends. Any stress build-up on mounting or temperature changes is relieved by the grooves allowing the central aperture of the mirror to remain flat. The use of small solder balls or epoxy joints to form small attachment posts further reduces the mounting stress. It is also possible that these attachment joints are defined by an additional step of etching posts on the order of 10 microns in height into the mirror substrate itself using a lithographically defined photoresist mask and a deep etching micromachining method such as the commercially available BOSCH etching process. This can help further defined the placement of the attachment points by limiting the reflow area of any attachment materials. If solder is used, these attachment posts must be covered with a solder wettable metal outer layer such as gold or nickel. However with careful controlled epoxy dispensing, attachment points 42 may be reproducibly be realized using a thin epoxy layer itself.

Figure 12:
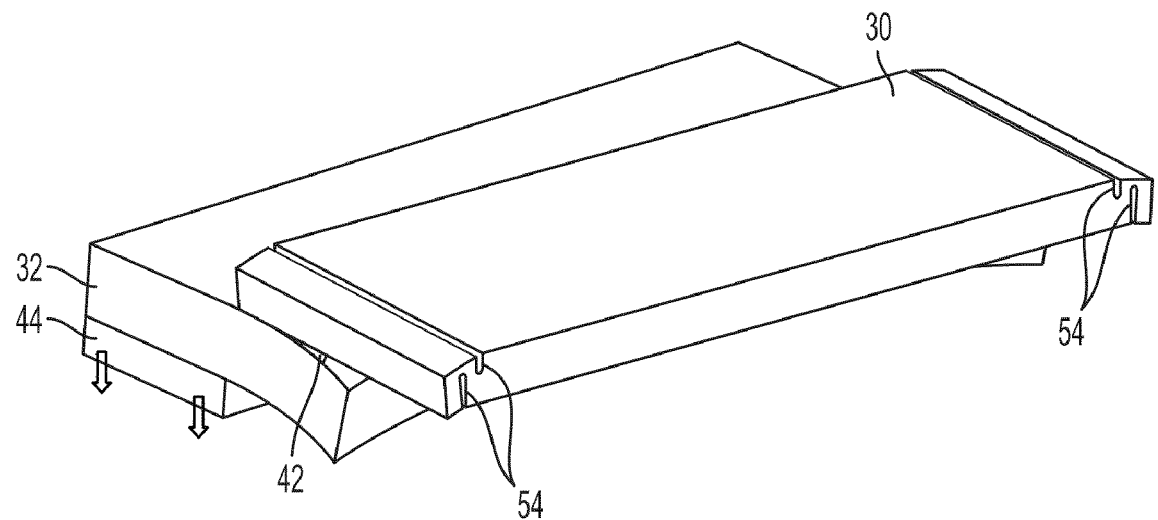
FIG. 12 illustrates how mirror flatness can be maintained over temperature variations by allowing stress relieving grooves to freely deform while the active central portion of the mirror surface remains flat.

The results of forming this stress relieving structure in the mirror are depicted in FIG. 12, which shows a finite element simulation with a mirror mounted to the piezoelectric bender utilizing this arrangement of grooves 54. Under identical boundary conditions to those depicted in FIG. 10, the mirror maintains a substantial amount of flatness over the central aperture after mounting it to the piezoelectric bender.

Figure 13:
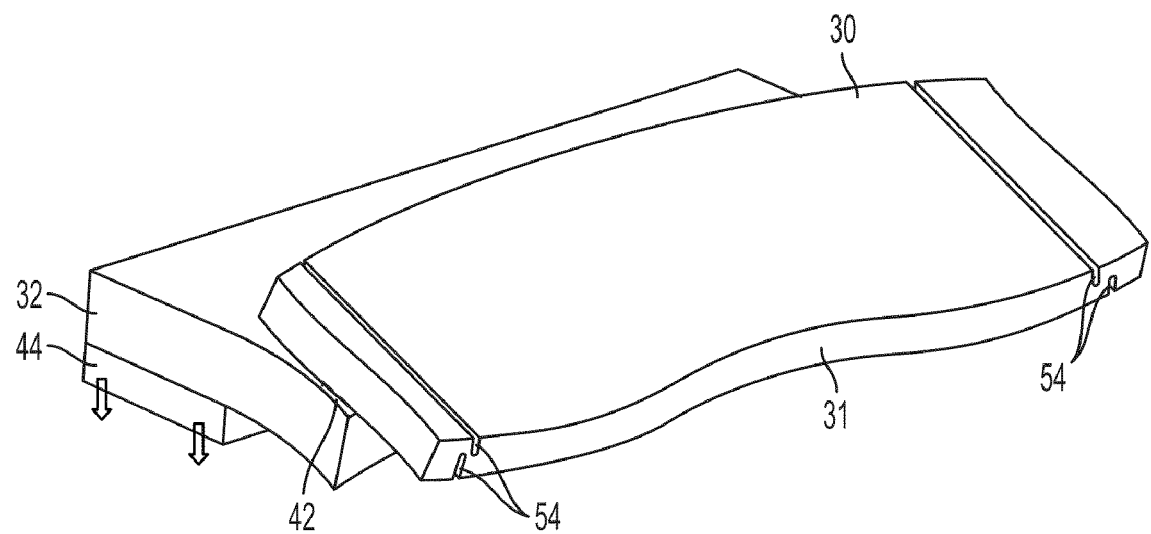
FIG. 13 is an illustration of the dynamic distortion a thin flat steering mirror can experience when operated near its resonance frequency.

Another problem mentioned is dynamic distortion of the mirror due to its own inertial mass during high frequency operation. FIG. 13 depicts the resulting dynamic distortions in the model shape for the fundamental resonance near 30 kHz where the amplitude of this motion has been artificially increased so as to emphasize the distortion in the mode shape. It will be noted that waviness is seen along the edge 31 of the mirror due to the fact it is not supported along its entire length along the central midpoint.

Figure 14:
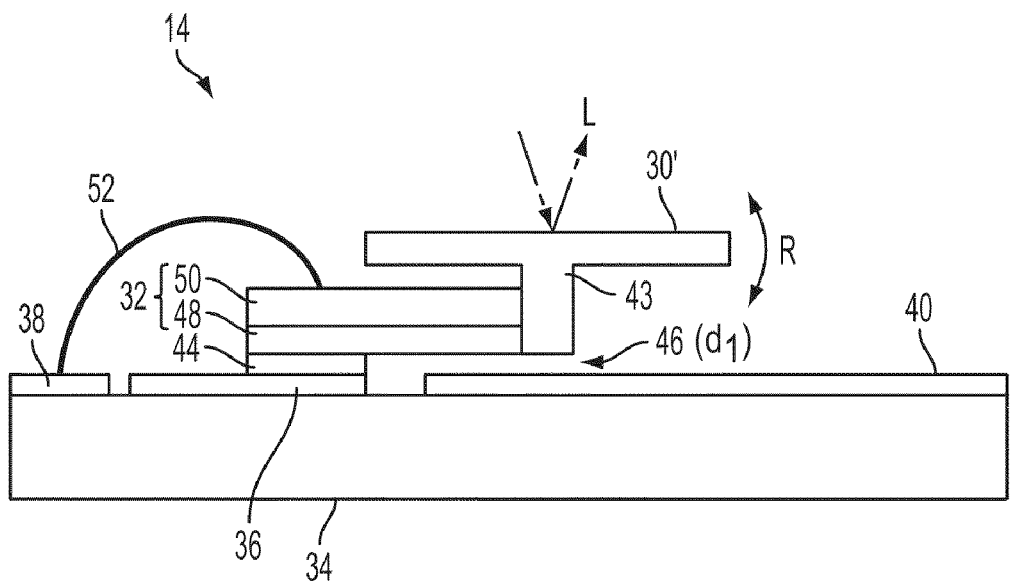
FIG. 14 is an elevation view of an agile beam steering mirror assemble with a 'T-shaped' cross sectional ridge at the midpoint of the mirror width and attached to the distal end of the piezoelectric bender.
Figure 15:
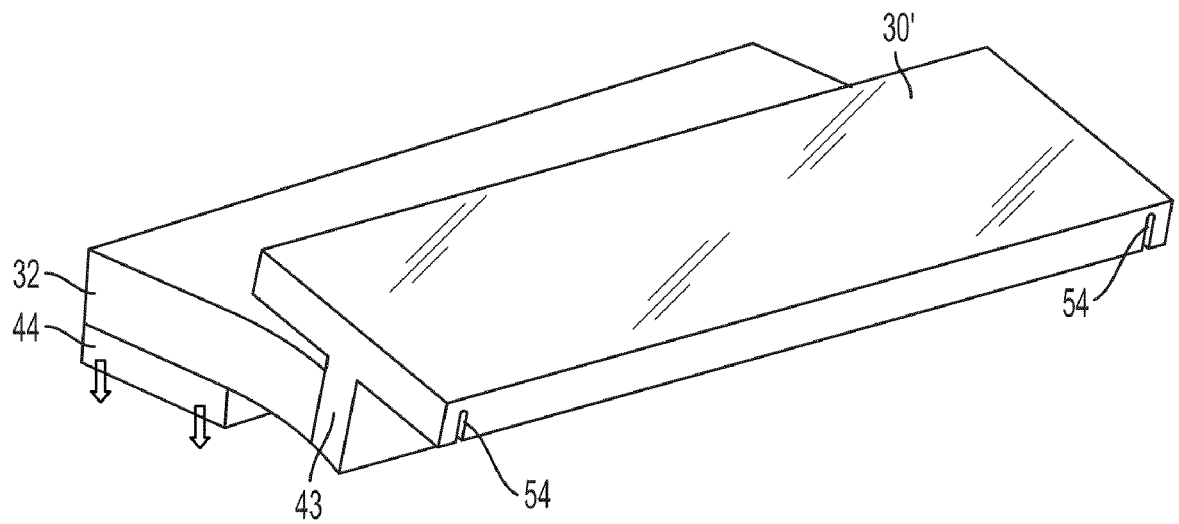
FIG. 15 is an illustration depicting the reduction in dynamic mirror distortion due to strengthening of the midpost.

In order to improve the dynamic flatness of the agile mirror during operation it is therefore prudent to stiffen the mirror along its length without contributing too much to the mirrors total mass. This can be done by providing a mirror 30' that is strengthened along its length using a cross-sectional T-shaped form, either as a unitary body or as a built-up structure. FIG. 14 depicts this embodiment, including the attachment of 'T-shaped' mirror 30' to the piezoelectric bender 32 at its distal end at attachment point 43. This arrangement further reduces curvature from mounting stress by eliminating the direct mounting to the top mirror surface. In addition, this arrangement eliminates stresses at the attachment point due to the top surface bending curvature of the piezoelectric bender when it is actuated. FIG. 15 depicts the dramatic reduction in dynamic mirror distortion when the 'T-shaped' mirror 30' is used. Such a shape can be formed using many methods using gentle mechanical polishing techniques known in the microoptics industry or using chemical etching techniques known in the micromachining industry. However, it is important that a high strength material is used such as silicon or fused silica (quartz) so as to reduce intrinsic curvature due to stresses while processing of these materials.

Figure 16:
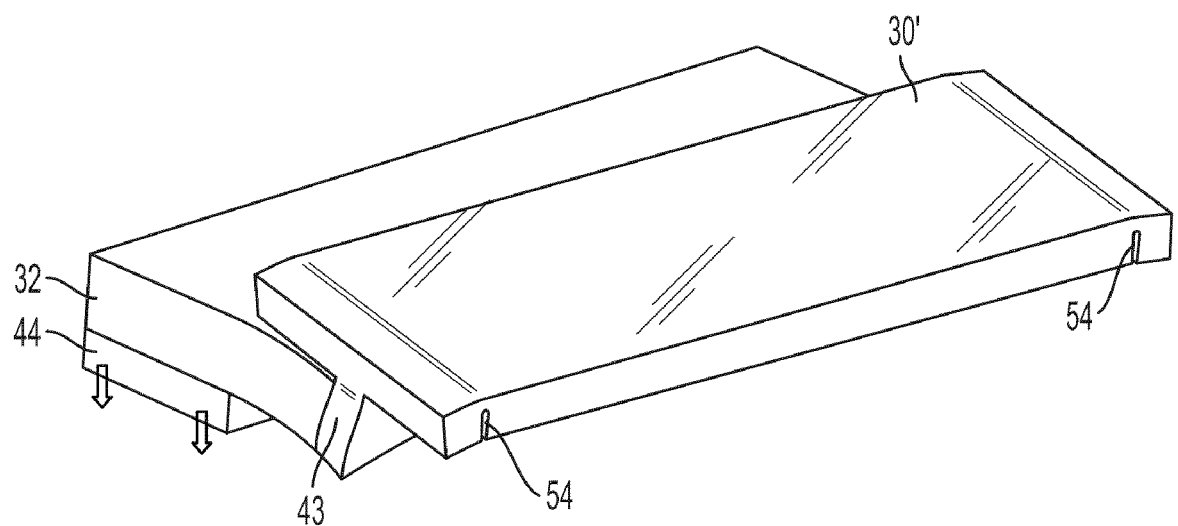
FIG. 16 illustrates how the flatness of a 'T-shaped' mirror can be maintained over temperature excursions by using stress relieving grooves in order to minimize mirror distortion in its active central region.

In order that the 'T-shaped' mirror 30' still have little or no static curvature it is still important that a series of grooves 54 be cut through the mirror surface in order to relieve mounting stresses and any CTE mismatches already previously discussed. FIG. 16 shows the results of a finite element analysis which show that even single grooves cut through the 'T shaped' structure 30' are adequate for maintaining mirror flatness. From the drawing perspective of FIG. 16 only one of three attachment points 43 can clearly be seen. These points are situated along the edges of the ridged base of the T-shaped mirror and one in the very middle of this base. It should be noted that various combinations of attachment joints, stress relieving groove patterns, and cross-sectional stiffing shapes are likely to sufficiently ameliorate the problem of maintaining static and dynamic flatness. The static and dynamic flatness maintaining example structures discussed here form one embodiment useful to illustrate important aspects of this agile mirror design required to realize its practical use in a commercial printing system.

Figure 17A:
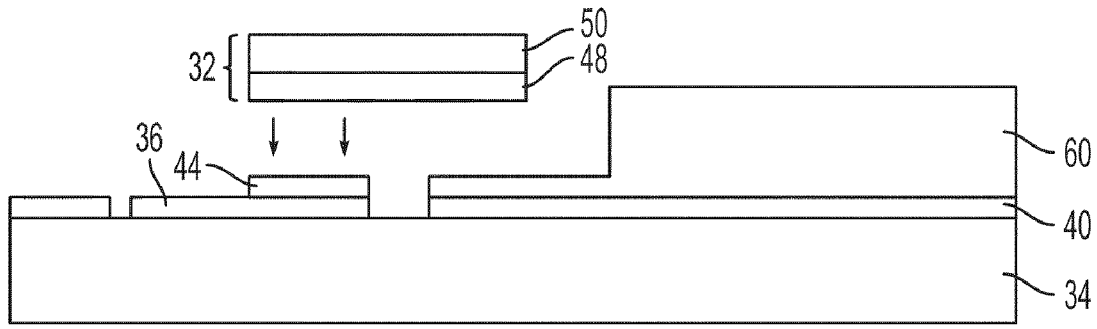
Figure 17B:
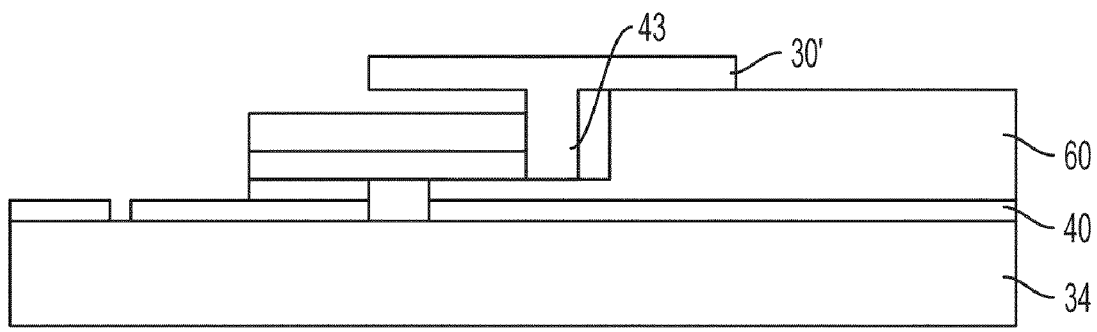
Figure 17C:
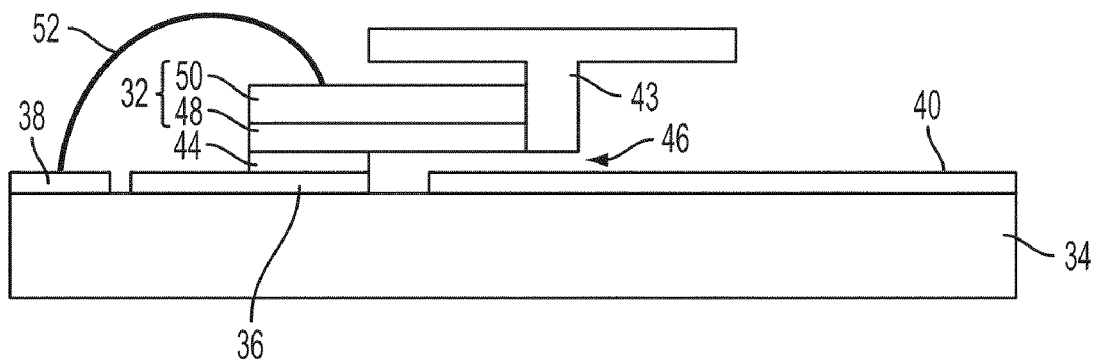

FIGS. 17A-C illustrate the steps in the process of mounting mirror 30 onto bending actuator 32 as well as other steps involved in the manufacture of agile beam steering mirror assembly 14 according to one embodiment of the present invention. According to this embodiment, the assembly of agile beam steering mirror assembly 14 consists of three steps. First, as illustrated in FIG. 17A, the base of the bending actuator 32 is soldered under heat and pressure to substrate 34 (on which has previously been formed electrodes 36, 38, and 40) using, for example, preformed solder pad 44. This joint provides electrical contact between first drive electrode 36 the lower layer of bimorph bending actuator 32, as well as ridged mechanical support for bending actuator 32. The solder pad may consist of a flat perform shape. In order to facilitate the repeatable placement of the solder 44 and the piezoelectric bender 32, a shim 60 may be used to set their relative positions.

Second, mirror 30 is glued onto the bending actuator 32 along joints 42 (only one seen from this few point) using high strength high glass transition temperature (Tg) wickable epoxy such as 353ND available from Epotek, a commonly used epoxy in the fiber optics industry. It should be noted that many wickable thermal and/or UV cross linkable epoxies are suitable for this purpose. The epoxy along joints 43 can be placed at three distinct attachment positions or posts such as the two edges of the mirror and at a center point so as to minimize the total bonding area at 43 but provide sufficient mechanical strength and robustness. Again the same shim 60 or a slightly different shim may be used to facilitate the assembly of the mirror 30 to the piezoelectric bender 32. The epoxy can be cured with the application of heat or with UV light if the shim and mirror are made out of a transparent material such as glass.

Third, and with reference to FIG. 17C, a top electrical drive contact is provided by soldering electrical lead 52 to the upper layer 50 of bending actuator 32, or alternatively by using a wire bonding tool or the like. Any shim 60 may be removed, resulting is mirror 30 being bonded at posts 42 to bending actuator 32, which in turn is mounted as a cantilever over capacitive electrode 40, with lower layer 48 in electrical contact with first drive electrode 36 and upper layer 50 in electrical contact with second drive electrode 38 by way of lead 52.

As previously discussed, the embodiment described above provides a capacitive sensing function which provide displacement information used in a feedback arrangement for mirror position control. There are many different methods for sensing changes in capacitance all of which utilize a high frequency AC excitation. Today, capacitive sensing is used in many different applications including accelerometers, pressure sensors, and capacitive touch mouse pads and keypads. Accordingly, there exist in the art a number of relatively low cost integrated devices (ICs) which are designed to directly measure capacitance changes over various capacitive ranges and bandwidths. One specific example is model CAV414 from Analog Microelectronics (http://www.analogmicro.de). The CAV414 provides a moderate frequency and capacitance sensing range as well as providing an onboard temperature sensor. However, a capacitive sensing circuit fabricated from discrete components is another alternative.

In addition to capacitive measurement, a high voltage amplifier stage 65 is required for the feedback control portion of the present invention, as depicted in FIG. 8. While there are numerous monolithic high voltage linear amplifier chip suppliers in the market, we have found that in order to reduce overall system cost, a single high voltage amplifier circuit made from the Supertex discrete HV FETs shown in FIG. 16 may be an appropriate choice for one embodiment of the present invention. Thus, a low voltage microcontroller signal ($V_{in}$) may be transformed into a high voltage signal ($V_{out}$) that can be used to drive the piezoelectric bender 32

A further element associated with implementation of agile beam steering mirror system 14 is a high voltage (HV) power supply 63 (FIG. 8). In implementations where agile beam steering mirror assembly 14 forms a part of a xerographic printer or copier, the existing high voltage source from a scorotron or developer subsystem may be utilized. In other applications or taking into account system complexity and subsystem reliability, it may be necessary or desirable to utilize a separate DC-DC converter circuit. One approach is to provide the HV supply from discrete components such as shown in FIG. 19, using, for example, a MAX668 IC available from MAXIM Integrated Products, Dallas Semiconductor (www.maxim-ic.com; see application note 1109 entitled "Small, High-Voltage Boost Converters" at this site The circuit of FIG. 19 provides a 5V to 150V DC boost converter circuit.

In implementation, a printer, copier, or similar ROS based system is build then calibrated. The calibration measures skew, bow, and banding, and appropriate scan line corrections are determined. These scan line corrections are implemented as positionally dependent rotations of mirror 30, for both overall system tuning mid-scan line correction (e.g., increasing rotation as scanned beam reaches mid-point of scan line then decreasing rotation as scanned beam reaches end of scan line in order to correct for bow correction). These rotations are effected by controlled calibration data voltage waveforms applied to the upper, lower or both layers of bending actuator 32. These waveforms must therefore be stored in memory associated with the agile beam steering mirror assembly 14, either onboard or otherwise provided to drive assembly 14.

Accordingly, a still further element associated with implementation of agile beam steering mirror system 14 is a microcontroller chip that has on board memory for storing the calibration data in EPROM or a FLASH with the waveform necessary to drive mirror 30 (or alternatively, a serial or I2R interface), at least one I2-bit or higher analog-to-digital converter (ADC) port, a simple medium speed math processor, one trigger port for synchronizing a timing single of the polygon scanner 16 (FIG. 3A) with the motion of mirror 30, digital outputs for watchdog control or a diagnostic mode, and a high speed digital-to-analog converter (DAC) for driving bending actuator 32. Several such chip solutions exist from several vendors.

Given that agile beam steering mirror assembly 14 will be repeatedly correcting for scan line position errors such as skew and bow for each scan line in a raster printing system, the overall motion of mirror 30 will be periodic. Given that the motion of mirror 30 will be periodic, according to one embodiment of the present invention provision is made to minimize hysteretic effects of that motion. This is accomplished by providing high bandwidth calibration, for example by way of apparatus 70 illustrated in FIG. 20. Apparatus 70 comprises a test beam source such as laser 72 and a split photodiode detector 74. Agile beam steering mirror assembly 14 is operated as intended, and the beam reflected from mirror 30 is detected by split photodiode detector 74. The beam reflected by mirror 30 will tend to oscillate between the two sections split photodiode detector 74. Hysteretic oscillation may be monitored, and the operation waveform adjusted to compensate therefor. Accordingly, high bandwidth calibration of the mirror position may be made in order to optimize the waveform needed to reduce dynamic hysteresis.

It should now be appreciated that the present invention permits an improved device and method for reducing banding, bow, and skew in raster output scanner-based printing and copying devices. However, the present invention also provides the opportunity to stitch together multiple ROS systems in a uniform manner with reduced alignment error due to variations between individual ROS system. Such multiple ROS systems could provide high speed xerography to be extended to much wider media formats. Application of the agile beam steering mirror assembly of the present invention in such multiple ROS systems overcomes the challenges and limitations of static, manual alignment of such systems. In addition to technical improvement over prior art methods for conjoining multiple ROS systems, the agile beam steering mirror assembly also provides for a simpler and lower cost feasible solution. In summary, the design goals of the agile beam steering mirror system of the present invention is correction of banding, bow, and skew. These goals are met using a short piezoelectric bending actuator which controls mirror angle of a pre-ROS integrated flat micromachined mirror structure. The bending actuator employs a feedback capacitor sensing circuit capable of correcting for low frequency creep and temperature dependent drift. Higher frequency hysteresis loop motion is corrected for by initial characterization with a high bandwidth measurement system and then adjustment of the shape of the drive characteristics to effectively linearize the actuation. A high voltage drive source in the range of 100-200 V is employed together with a microcontroller with moderate speed ADC and DAC, and serial or I2R interfaces with digital interrupt lines. In addition, squeezed film damping may be employed to lower Q. A micromachined mirror patterned to include mounting posts and groves reduce CTE related mirror deformation.

The agile beam steering mirror assembly provides automatic registration and alignment of cross axis calibration, and replaces more expensive optical parts with lower priced and lower tolerance optical parts, eliminating imaging banding, bowing, and skew. Thus total system cost, complexity, and quality improve for many different types of xerographic printing products. Finally, the agile beam steering mirror assembly of the present invention allows the stitching together of two or more ROS systems by eliminating the need for manual alignment.

While a plurality of preferred exemplary embodiments have been presented in the foregoing detailed description, it should be understood that a vast number of variations exist, and these preferred exemplary embodiments are merely representative examples, and are not intended to limit the scope, applicability or configuration of the invention in any way. For example, the present invention has been described in terms of a raster output scanner. While the present invention is particularly configured to address scan line position errors in a scan line based optical system, such a system need not necessarily be a ROS system, but may one of a variety of other types of scanning optical systems. Furthermore, while the present invention has been described in terms of a printing system, it may find application in a wide variety of other optical scanning systems, as will be appreciated by one sill in the art. Therefore, the foregoing detailed description provides those of ordinary skill in the art with a convenient guide for implementation of the invention, by way of examples, and contemplates that various changes in the functions and arrangements of the described embodiments may be made without departing from the spirit and scope of the invention defined by the claims thereto.

What is claimed is:

1. A method of aligning a light beam in an optical scanning system comprising the steps of:

generating a light beam which scans in a scan line direction;

causing said light beam to be incident on a mirror surface at a first angle to a plane of said mirror surface, said mirror surface forming a portion of a non-deformable mirror structure of an agile beam steering mirror system, said agile beam steering mirror system comprising:

a substrate having formed thereon a drive electrode;

a laminated piezoelectric bending actuator:

said laminated piezoelectric bending actuator attached at a proximal end thereof in a cantilever fashion to said substrate;

a first layer of said laminated piezoelectric bending actuator being in electrical contact with said drive electrode;

a distal end of said laminated piezoelectric bending actuator is disposed over but not touching said substrate such that a gap is formed between said distal end and said substrate, said distal end free to rotate toward and away from said substrate in response to a voltage potential applied to said first layer of said laminated piezoelectric bending actuator, said rotation thereby changing the size of said gap; and said non-deformable mirror structure having said mirror surface and a mounting surface, said mounting surface have a plurality of mounting posts formed thereon, said non-deformable mirror structure mounted at said mounting posts to said distal end of said laminated piezoelectric bending actuator; and determining the relative size of said gap by measuring changes to a voltage applied to a capacitive sensing electrode located on said substrate below said distal end of said piezoelectric bending actuator at various degrees of rotation of said distal end; and adjusting the position of said light beam in a direction generally perpendicular to said scan line direction, as determined in part by said relative size of said gap, by applying a voltage to said first layer of said laminated piezoelectric bending actuator causing rotation of said distal end of said piezoelectric bending actuator and hence a change in the angle of incidence of said light beam on the plane of said mirror surface;

wherein voltages required to be applied to said drive electrode to correct periodic scan line position errors of said light beam is defined by a waveform, and further wherein a definition of said waveform is stored in a memory associated with said agile beam steering memory system, and still further wherein said waveform is provided to a microcontroller together with the relative size of said gap, said microcontroller causing an appropriate voltage potential to be generated by a voltage supply connected to said drive electrode so as to correct for said periodic scan line position errors.

* * * * *